US009693579B2

(12) United States Patent
Camany

(10) Patent No.: US 9,693,579 B2
(45) Date of Patent: Jul. 4, 2017

(54) METHOD FOR ELIMINATING BACTERIA FROM FOOD

(71) Applicant: Lex Camany, Royal Oaks, CA (US)

(72) Inventor: Lex Camany, Royal Oaks, CA (US)

( * ) Notice: Subject to any disclaimer, the term of this patent is extended or adjusted under 35 U.S.C. 154(b) by 0 days.

(21) Appl. No.: 15/189,463

(22) Filed: Jun. 22, 2016

(65) Prior Publication Data

US 2016/0295900 A1 Oct. 13, 2016

Related U.S. Application Data

(62) Division of application No. 13/292,622, filed on Nov. 9, 2011, now Pat. No. 9,392,803.

(60) Provisional application No. 61/411,744, filed on Nov. 9, 2010.

(51) Int. Cl.
| | |
|---|---|
| *C02F 1/46* | (2006.01) |
| *A23L 3/32* | (2006.01) |
| *A23B 4/015* | (2006.01) |
| *A23C 3/00* | (2006.01) |
| *A23C 19/097* | (2006.01) |

(52) U.S. Cl.
CPC .............. *A23L 3/325* (2013.01); *A23B 4/015* (2013.01); *A23C 3/00* (2013.01); *A23C 19/097* (2013.01)

(58) Field of Classification Search
None
See application file for complete search history.

(56) References Cited

U.S. PATENT DOCUMENTS

| | | | | |
|---|---|---|---|---|
| 2,485,660 A * | 10/1949 | Robertson | ................ | A23L 3/01 219/772 |
| 4,196,221 A | 4/1980 | Dew | | |
| 6,093,432 A | 7/2000 | Mittal | | |
| 2009/0068325 A1 | 3/2009 | Depicciotto | | |

* cited by examiner

*Primary Examiner* — Arun S Phasge
(74) *Attorney, Agent, or Firm* — LaRiviere, Grubman PC

(57) ABSTRACT

The present invention discloses a method to eliminate gram negative bacterial pathogens from food or produce. This method includes the steps of exposing produce or food to an electrically conductive medium having an anode and a cathode; inserting the anode of the electrically conductive medium into a water flume; connecting the cathode of the electrically conductive medium to a conveyor belt to convey the produce or food through the water flume for increasing the negative electrostatic charge on the surface of the pathogen cells selected to cause cell lysis; and attaching one or more misters to the roof of a water chamber to disperse the water in the water chamber. When DC current is applied to any pathogen cell that is gram negative, it overrides the internal governing electrostatic charge controlling the pathogen cell causing cell lysis. This is the "Achilles heel" of gram negative bacteria pathogen cells.

14 Claims, 5 Drawing Sheets

| Test # | Sample ID | Description | Method | Results | Volts | Amps | Seconds |
|---|---|---|---|---|---|---|---|
| 1.) | SCA-082310-001 | Water Bath - Red Chard | E.coli | <1 cfu/g | 60-70 | 2 | 30 |
| 2.) | SCA-082310-002 | Water Bath - Red Chard | E.coli | <1 cfu/g | 60-70 | 2 | 30 |
| 3.) | SCA-082310-003 | Belt - Red Chard | E.coli | <1 cfu/g | 60-70 | 2 | 30 |

| Test # | Sample ID | Description | Method | Results | Volts | Amps | Seconds |
|---|---|---|---|---|---|---|---|
| 1.) | SCA-082610-264 | Spinach | E.coli | 10 cfu/g | 70+ | 1 | 30 |
| 2.) | SCA-082610-268 | Water - Spinach | E.coli | 20 cfu/g | 70+ | 1 | 30 |
| 3.) | SCA-082610-267 | Belt - Spinach | E.coli | 30 cfu/g | 70+ | 1 | 30 |
| 4.) | SCA-082610-265 | Mist & Chamber - Spinach | E.coli | 38 cfu/g | 100+ | 2 | 60 |
| 5.) | SCA-082610-270 | Soil - Spinach | E.coli | 70 cfu/g | 200+ | 2 | 60 |
| 6.) | SCA-082610-271 | AC - Spinach | E.coli | 210 cfu/g | 110 | 10 | 60 |

| Test # | Sample ID | Description | Method | Results | Volts | Amps | Seconds |
|---|---|---|---|---|---|---|---|
| 1.) | SCA-090811-104 | Spinach | E.coli | 3 cfu/g | 70+ | 1 | 30 |
| 2.) | SCA-090811-105 | Water - Spinach | E.coli | 3 cfu/g | 70+ | 1 | 30 |
| 3.) | SCA-090811-106 | Belt - Spinach | E.coli | 7 cfu/g | 70+ | 1 | 30 |
| 4.) | SCA-090811-109 | Mist & Chamber - Spinach | E.coli | 22 cfu/g | 100+ | 2 | 60 |
| 5.) | SCA-090811-108 | Soil - Spinach | E.coli | 38 cfu/g | 200+ | 2 | 60 |

Figure 5

METHOD FOR ELIMINATING BACTERIA FROM FOOD

CROSS-REFERENCE TO RELATED APPLICATION

This application is a divisional application, claiming priority to co-pending U.S. patent application Ser. No. 13/292,622, filed Nov. 9, 2011, entitled Apparatus for the Elimination of Bacteria from Food, which claims priority to Provisional Patent Application Ser. No. 61/411,744, filed Nov. 9, 2010, entitled Method and Apparatus for the Elimination of Bacteria from Food.

BACKGROUND OF THE INVENTION

Gram negative bacteria, including strains of *Escherichia coli* and *Salmonella*, are hazardous to human health, particularly when food items are contaminated with them. In addition to the health affects on those who consume contaminated food, outbreaks of illness associated with bacteria contamination represents a major adverse economic threat to food industries, particularly when production must be halted to identify the source of the contamination, and when products already released into the market must be recalled.

Certain attempts have been made to introduce an effective "kill-step" into the line of production for foods, including subjecting food to various chemicals or radiation that may be partially lethal to the pathogens. However, these methods have proven to be less than ideal solutions because they do not guaranty a high enough rate of effectiveness, and also because they subject food to residues that present their own health impacts and/or interference with flavor, etc.

Therefore it is desirable to achieve a so-called "kill-step" that eliminates most, if not all, bacteria pathogens from food or produce. It is also desirable that such a "kill-step" be relatively inexpensive, and—when possible—be effectuated by an apparatus that can be retro-fitted to existing food production equipment for produce, meat, dairy, and other foodstuffs.

Some basic definitions of the scientific principles involved in the process may be helpful at this point. Electrical current effects changes in cell surface properties. These changes occur by affecting the following: surface hydrophobicity, net surface electrostatic and all surface shapes and polymers. Hydrophobicity is explained as a "dislike and like" of the microbial to water. Hydrophobic interactions define the strong attraction between hydrophobic molecules and surfaces in water. This hydrophobicity determines adherence to surfaces. Polysaccharides, proteins and amino acids are all hydrophobic in nature and make up the compounds of the cell walls. The net negative surface electrical charge is increased under DC applications and determines the interaction between bacteria cell, surfaces, and DC currents.

Electric DC current can change cell movement from surfaces. This is because bacteria cells are generally negatively charged which dictates their electrophoresis movement in DC currents. In essence, it overrides and energizes the internal governing system at the surface level and causes instant absorption of H2O into the cell and blows up the cell, similar to a balloon filled with water. When bacterial species are exposed to DC electrical current or fields, they affect cell surfaces and cell shapes. This process also involves electro kinetics. Electro kinetics is the application of a weak DC current or potential to soil or products or aquifer and water. The mode of action through the cell surface hydrophobicity plays out through electrical current causing cell shape change and increases the net negative surface electrical charge. This change affects extracellular polymers as well as Hydrophobicity, which, is greatly increased after DC current applications. DC current can and does increase the negative surface electrostatic charge causing H2O to rush in burst and flatten the cell walls.

Once the cell wall is saturated with DC current, irreversible permualization of the cell wall occurs then oxidation reduction takes place to finish bacteria off. Electric DC current effects orientation of the membrane lipids and through electrical application causes irreversible permeabilization of the cell wall. DC current also produces oxidation reduction agents such as chlorine and hydrogen peroxide.

SUMMARY OF THE INVENTION

The present invention discloses a system and a method to eliminate *E. Coli* bacteria from various food products. When DC current is applied to any pathogen that is gram negative, it overrides the internal governing electrostatic charge that controls and causes the hydrophilic nature of *E. Coli* to be activated and rushes in water instantaneously. This results in *E. Coli* blowing itself up. This is *E. Coli*'s "Achilles heel". Testing has shown when *E. Coli* is exposed to as little as 30 volts for approximately 30 seconds, 99.9% of ALL *E. Coli* were killed. 100% kill using 60 volts has been achieved through this invention.

Another aspect of the invention is to provide a method for eliminating bacterial pathogens from produce or food. This method includes the steps of exposing produce or food to an electrically conductive medium having an anode and a cathode; inserting the anode of the electrically conductive medium into a water flume; connecting the cathode of the electrically conductive medium to a conveyor belt to convey the produce or food through the water flume for increasing the negative electrostatic charge on the surface of the pathogen cells selected to cause cell lysis; and attaching one or more misters to the roof of a water chamber to disperse the water in the water chamber.

In this disclosure, the terms "food" and "produce" have the same meaning and can be used individually, collectively or linked by the term "or" and still have the same meaning.

Consequently, for a better understanding of the present invention, its functional advantages and the specific objects attained by its uses, reference should be made to the accompanying drawings, claims and descriptive matter in which there are illustrated preferred embodiments of the invention.

BRIEF DESCRIPTION OF THE DRAWINGS

FIG. 5 is a sample depiction of test results showing that applying the kill test removed the *E. Coli* bacteria from all tested food products.

DETAILED DESCRIPTION OF THE INVENTION

Figure 1:
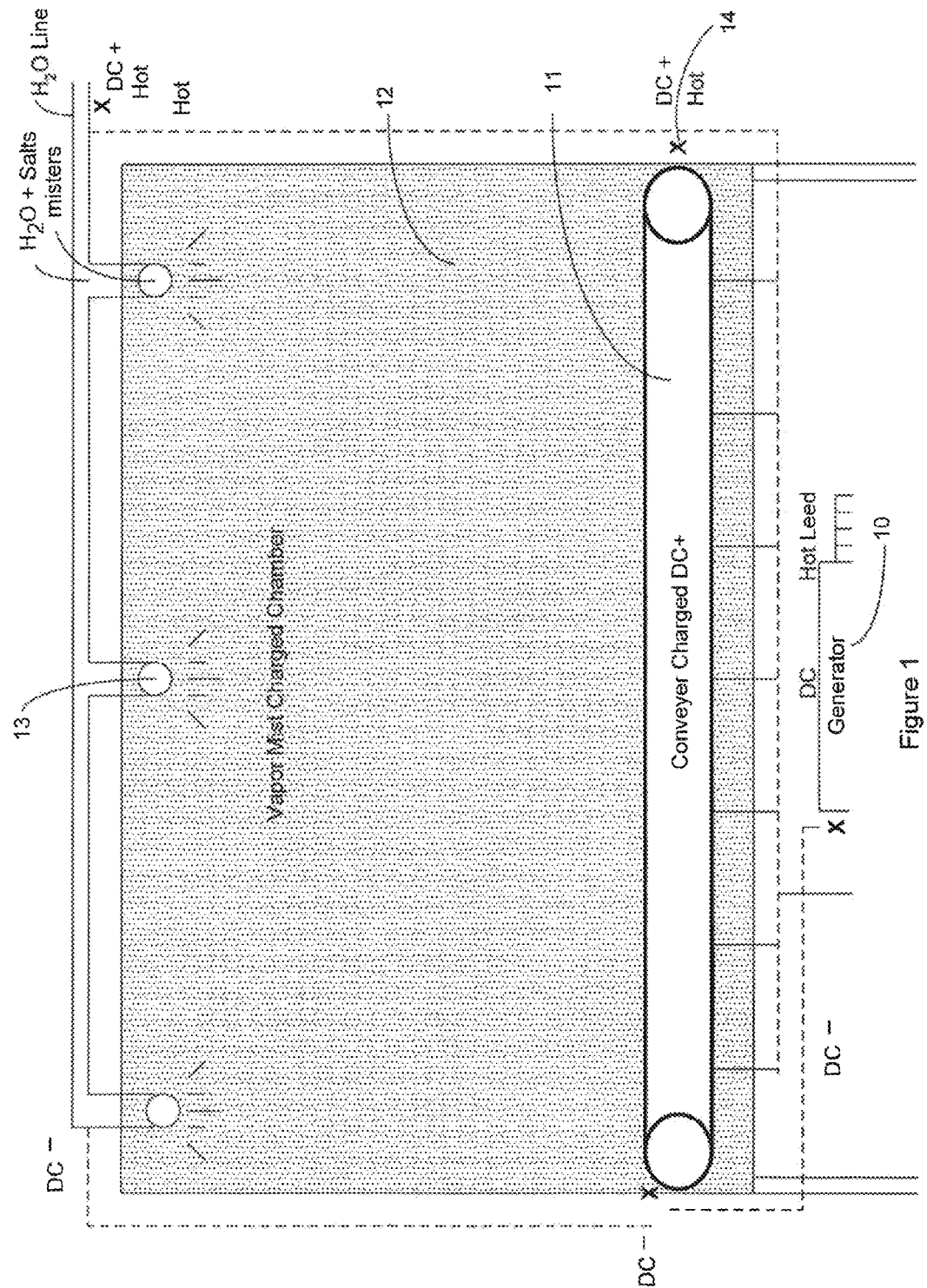
FIG. 1 illustrates a DC charged chamber.
Figure 2:
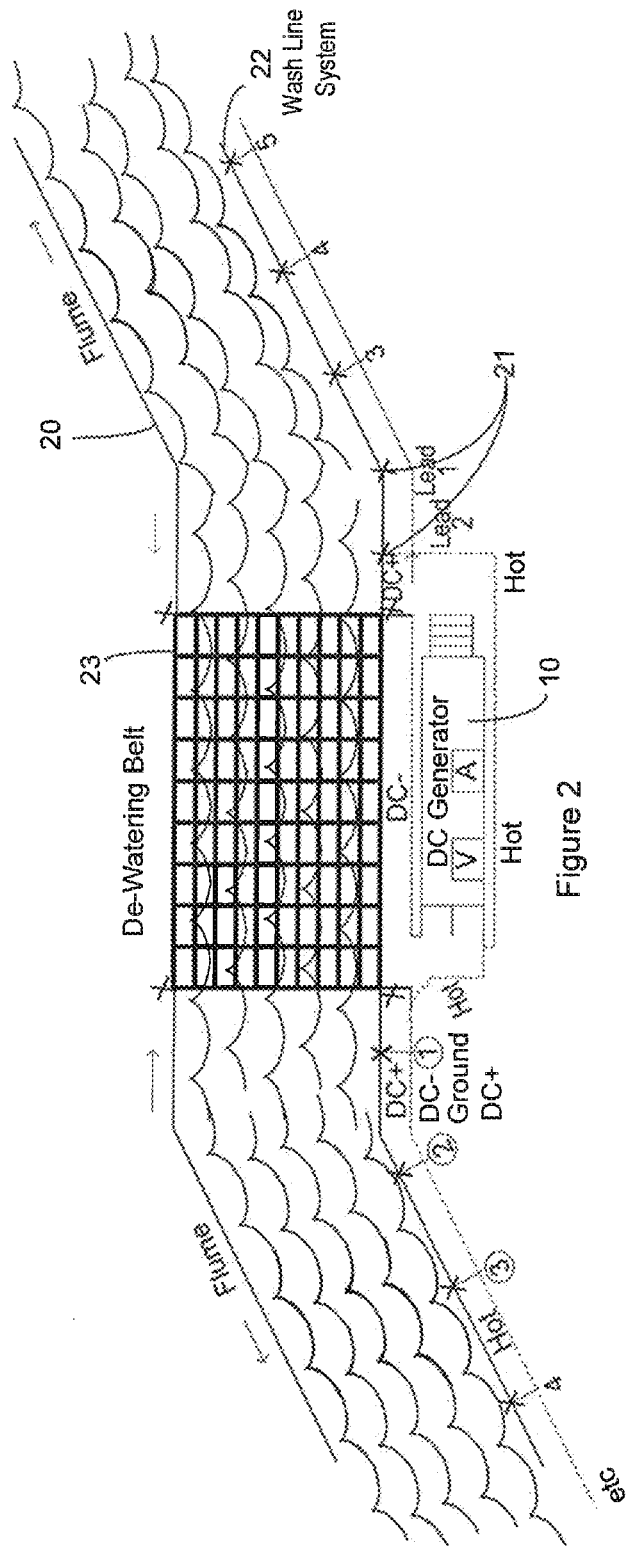
FIG. 2 is an illustration of wash line and dewatering belts.
Figure 3:
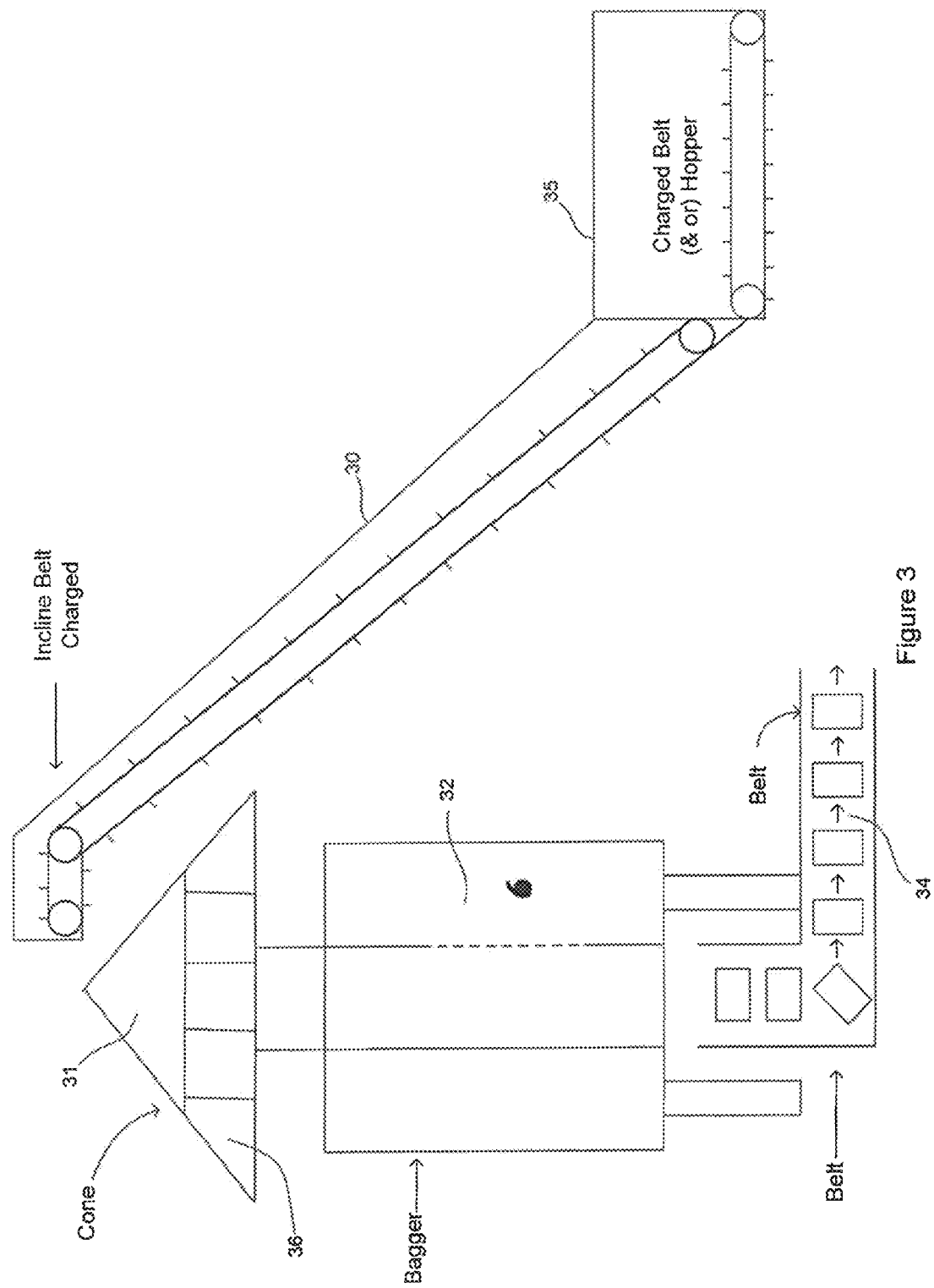
FIG. 3 illustrates incline belt to electrified bagger and cone.
Figure 4:
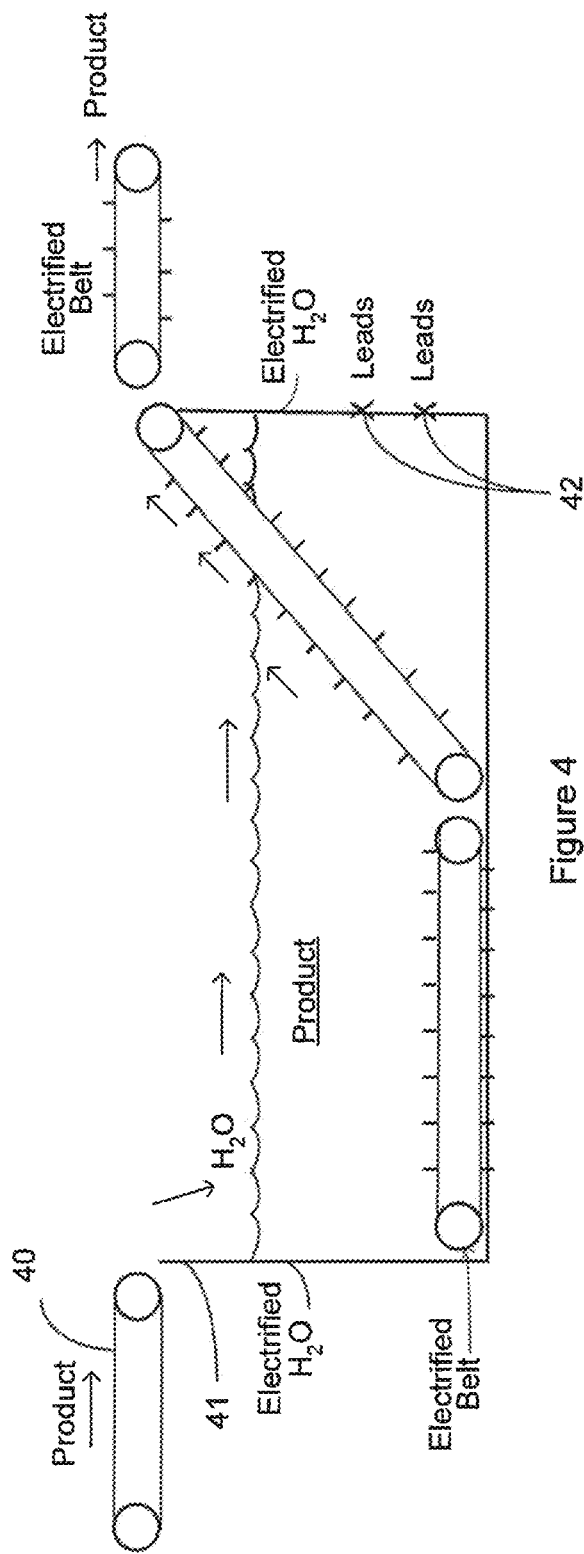
FIG. 4 illustrates the kill step as applied in the pre-harvest field.

The following detailed description is of the best currently contemplated modes of carrying out various embodiments of the invention. The description is not to be taken in a limiting sense, but is made for at least the purpose of illustrating the general principles of the invention, since the scope of the invention is best defined by the appended claims.

Applicant has determined that subjecting gram negative pathogens, such as *E. Coli* and *Salmonella*, to direct current—within specific voltage and amperage ranges—is lethal to those pathogens at an effectively complete rate. Applicant has determined that similar results can be achieved by exposing said pathogens to electrolyzed water. These methods are advantageous because they generally do no harm to produce, meat or other foods and leave no measurable residues of chemicals that would interfere with food safety or flavor. One of the mechanisms of the kill is that it affects solids and fluids.

It has been determined that direct current anywhere in the range of 30 to 105,000 volts may be lethal to gram negative pathogens. Similarly, it has been determined that current in the range of 0.01 milli-amps to 50 amps are effectively lethal to said pathogens. In various possible embodiments of the inventive concept, exposure times have been shown to be effective in as little as 0.75 seconds or as much as 90 seconds, depending upon voltage and current, again dependent upon the food substance being treated. Therefore, according to the present inventive concept, an effective method for treating produce, meat or other foods may be to subject those foods to direct current within said ranges in order to kill bacterial pathogens.

In various embodiments of the inventive concept the voltage may be varied over time in a manner appropriate for the food product or substance being treated. Alternatively, it is possible that alternating current, or rectified alternating current may also be used in an effort to treat the food product or substance being treated. The voltage and current required for any particular food product or substance will vary and such variations may be apparent to one reasonably skilled in the art.

In one possible embodiment of said inventive concept, food conveyance equipment or dryers may be equipped with electrodes such that food (e.g., produce) passing along said conveyance equipment is subjected to direct current within the necessary ranges. In an alternative embodiment of the inventive concept, food to be treated may be passed through a water bath, chamber or tank, again equipped with positive and negative leads such that direct current passes across said bath or tank. In various alternative embodiments, as many pairs of positive and negative leads may be attached to said bath or tank as is necessary to achieve roughly uniform direct current across the water medium. Similarly, conveyance equipment may be equipped with multiple pairs of leads such that produce or that food is subjected to direct current. Said current may be made possible either by equipping the conveyance surface with conductive material (such as copper, aluminum or other metal), or by subjecting the conveyance zone with a water mist by means of overhead misters. Other embodiments or alternatives that adequately subject produce or other food to an electrically conductive environment will be obvious to one reasonably skilled in the art and are intended to be incorporated herein.

For embodiments reliant upon conductive conveyor belts, alternative embodiments include mesh, diamond cut, or solid belts. The only limiting aspect of the embodiment is that the direct current adequately passes through the produce or other food being moved by said conveyance is subjected to the direct current.

In additional possible embodiments, the inclusion of various additives to said water bath or mist, including chlorine, chlorine compounds, hydrogen compounds or mineral salts, may increase the effectiveness either by reducing the time required or voltage required to deliver a fully lethal dose of direct current to bacterial pathogens.

The direct-current "kill-step" apparatus can be integrated into wash-lines in processing facilities, incline-belts at bagging/packaging facilities, or even into harvest equipment in the field.

DC is a straight-lined current. AC is an alternating current in its wave form. Heat is associated with the AC current spectrum due to alternating currents which creates friction that produces heat. DC current has very little thermal heat associated with it, preserving quality and not harming product.

The principal foundation stone of the kill step is that *E. Coli* and other pathogens that are gram negative are negatively charged at the molecular level. This turns out to be the "Achilles heel" of all pathogens that are gram negative. Because *E. Coli* is negatively charged, it interfaces with hydrogen atoms balancing their liquid media. Its surrounding micro environment and its interaction with it and water molecules is called hydrophobicity, the love and hate relationship between water and *E. Coli*.

When DC current is applied to any pathogen that is gram negative, it overrides the internal governing electrostatic charge that controls and causes the hydrophilic nature of *E. Coli* to be activated. This results in *E. Coli* blowing itself up. This is *E. Coli's* "Achilles heel". Testing has shown when *E. Coli* is exposed to as little as 30 volts for approximately 30 seconds, 99.9% of ALL *E. Coli* were killed. The present invention achieved 100% kill using 60 volts. FIG. 1 illustrates a DC charged chamber. The size of DC Generator 10 is determined by the load that needs to be processed and the space that needs to be charged to kill the *e-coli* effectively i.e., a product of length width and depth. The amount of charge in the air is determined by calculating the sum of distance plus volts plus amps. Conveyer system 11 is used for conveying the charged particles through a distance. Conveyer speeds are determined by dwell times. The vapor mist charged chamber 12 can be lined with various substances such as aluminum. The vapor mist charge chamber 12 also consists of water in addition to sanitizers, misters such as pvc pipe with a nozzle 13 at the end. The mist is electrically charged. The conveyor belt 11 is electrically charged with DC current. The DC conveyer belt 11 is retrofitted with multiple hot leads 14 to achieve uniform electrical distribution of current throughout the conveyer belt 12. The misting chamber 12 is electrically charged with DC current which is evenly distributed by the electric charge throughout the system by multiple hot leads 14. In one implementation of the system, hydrogen peroxide compounds, chlorine compounds and other sanitizing chemicals could be added as synergistic and enhancing applications.

After the initial flash contact of DC current with gram negative pathogens, a secondary aspect of DC current is produced which include hydrogen peroxide and chlorine. Both may be naturally produced at the location of the flash becoming the final oxidation reduction agents, once irreversible permeabilization of the cell wall is achieved through DC current application.

The kill step may not only treat the products externally, but may also kill gram negative pathogens and toxins inside infected plants and tissues exploiting the same principal of killing. One of mechanics of the kill is that it affects solids and fluids. This is accomplished through electricity and magnetism. The electrical current that is used is generally DC, though other type of currents may be used for this purpose. It affects electrical charges through Coulombs Law, by electrical fields such as voltage and current. The biology of living organisms is affected at the cellular level through the cell membrane, and cell structure via, cell energy flow and cell respiration. Both are considered lethal categories for pathogens. In one implementation, when quantum physics is applied, wave function used in Schrodinger equation can affects hydrogen energies and hydrogen spectrum through particles of force affecting the molecular structure.

The next step in this process is activated by a chemical reaction. Chemical kinetics and chemical equilibriums affect acids and bases, producing oxidation and reduction agents in the process. The bioelectrical phenomena applied to the cell wall affects potential, and increases, action potential of fluids. Also involved is electro chemistry which involves electro chemical compounds. DC current produces oxidation and reduction agents. It also changes the energy gradient of cell walls which affects equilibriums and constants.

The electro chemical reactions electrify the cell causing aqueous electrolysis producing chlorine and hydrogen peroxide. When electrodes are used at the cathode side, hydrogen peroxide is produced at the site. On the anode side, chlorine is produced, thus naturally producing two oxidation reduction agents. As a result of electrolysis and hydrogen peroxide, oxidizing radicals and chlorine molecules are produced. Other effects on the pathogen include oxidation of enzymes and coenzymes such as NADH. This leads to membrane damage, leakage of essential cytophasmin constituents and decreases respiration. In this process, further degradation of COA enzymes occurs. In summary, DC electrically oxidizes these enzymes which lead to inhibition of cell respiration and cell death.

Another advantage of the present technology is that DC current also has the potential to degrade the toxin itself once deployed inside the plant. Once bound to the cell, the pathogen excretes the toxin in a process called receptor-mediation endoctosis. These toxins once released are made up of two amino acids and are critical for the distinct glyolipid bonding of the toxin. If amino acids are broken down by DC current, then one can assume that exposure to DC current would destroy the integrity of amino acids that constitute the toxin making them dysfunctional.

FIG. 2 is an illustration of wash line and dewatering belts. The flume 20 can be of different sizes, width and height. The flume 20 has multiple hot leads 21 surrounding the wash line system 22. The product moves across an electrically charged dewatering belt 23. The flume 20 is on each side of electrically charged dewatering belt 23. Water goes into the second bath from the belt; the electrically charged flumes 20 are filled up with electrically charged water. Next the product to be processed is added into the flume 20 where it becomes electrically charged. After the food product reaches the electrically charged dewatering belt 23, the kill test may be applied, the food can once again be decontaminated. Washlines are in different shapes and sizes with varying widths; the kill step process can be applied to any washline. In another implementation, any processing equipment in the field or processing plants and any field operation and the watering plants applications can utilize this process.

FIG. 3 illustrates incline belt to electrified bagger and cone. The incline belt 30 can be made from any conductive metal, or composites, such as aluminum. The food may take between 15-20 seconds to reach the top. The incline belt 30, cone 31 and baggers 32 are all electrified. The food items to be processed are placed on the incline belt 30 and it travels to the cone 31. The food is processed on cone 31 and then bagged into bagger 32. It is an electrically charged belt with multiple leads in hopper and incline belt. After it comes out of the wash line 23 and dewatering belts, the food is put in the dryer, which may be electrified as well, and then transferred to the hopper 35. The belt is inclined in order to enable the food product to travel to the top of the bagger. The cone 31 is a weighing scale to weigh the produce coming in from the electrically charged incline belt 30 and loads the food into bucket 36. The food product is dropped from the bucket 36 to bagger 32 where it is packaged. Packaged food is then moved on the electronically charged belt 34.

FIG. 4 illustrates the kill step as applied in the pre-harvest field. The food product to be cleaned and processed enters the tank 41 via an electrified belt 40. Any application of misters is included. Multiple leads 42 are activated on the sides of the water tank 41. In order to disperse electrical charge uniformly, multiple leads 42 are placed around the tank 41 to ensure that electrical charge is spread evenly across the entire electric belt in the tank. In another implementation any sanitizing chemical such as chlorine, hydrogen peroxide can be added to the process for enhancement. Dwell times for the particular equipment can vary according to equipment and product.

FIG. 5 is a sample depiction of test results showing that applying the kill test removed the *E. Coli* bacteria from all tested food products. For example, applying 70+ volts at 1 amp to 10 g spinach for 30 seconds gave a 100% kill result for the present *E. Coli* bacteria. The spinach had been infected with *E. Coli* bacteria prior to testing. A person with ordinary skill in the art can use this technology to kill other pathogens as well, including gram positive bacteria.

The kill test results and concepts can be applied to pre- and post-harvest applications in the field preventing exposure to the processing plants eliminating contamination. Other industries and food providers such as meat, dairy, cheese, eggs, water, and soil etc. can utilize this kill system as well. The ready availability of DC batteries increases the acceptability of the process by consumers.

It should be understood that the foregoing relates to exemplary embodiments of the invention and that modifications may be made without departing from the spirit and scope of the invention. It should also be understood that the present invention is not limited to the designs mentioned in this application and the equivalent designs in this description, but it is also intended to cover other equivalents now known to those skilled in the art, or those equivalents which may become known to those skilled in the art in the future.

INDUSTRIAL APPLICABILITY

The invention pertains to a method of eliminating bacteria from food, specifically gram negative bacterial pathogens from food which may be of value or importance to various industries such as, but not limited to, farming/growers/produce/food market.

What is claimed is:

1. A method for eliminating bacterial pathogens from produce or food, the method comprising the steps of:

exposing produce or food to an electrically conductive medium, said medium having at least two electrically conductive terminals and applying an electric current across the electrically conductive medium at a pre-selected minimum voltage;

inserting one of the terminals of the electrically conductive medium into a water flume;

connecting the other one of the terminals of the electrically conductive medium to a conveyor belt to convey the produce or food through the water flume for increasing the negative electrostatic charge on the surface of the pathogen cells selected to cause cell lysis; and attaching at least two misters to the roof of a water chamber to disperse the water in the water chamber, the misters being coupled to a negative and a positive DC voltage respectively, whereby a mist of water dispersed therefrom is electrically charged by the electrically conductive medium for causing the cell lysis as the produce or food is conveyed on the conveyor belt through the water chamber.

2. The method of claim 1 wherein the other one of the terminals is grounded.

3. The method of claim 2 wherein a DC current produces oxidation reduction agents comprising chlorine or hydrogen peroxide to enhance the cell lysis of the pathogen cells selected.

4. The method of claim 2 wherein a DC current is generated by providing a conveyance surface having a conductive material comprised of copper or aluminum.

5. The method of claim 1 wherein the electrically conductive medium is a DC power source.

6. The method of claim 1 wherein the pre-selected voltage is in excess of 30 volts.

7. The method of claim 1 wherein the misted water dispersed in the water chamber includes water, sanitizers and minerals.

8. The method of claim 1 wherein the misters distribute electronically charged water particles substantially evenly within the chamber.

9. The method of claim 1 wherein the bacterial pathogens are gram negative bacteria.

10. The method of claim 9 wherein the gram negative bacteria is *E. Coli* or *Salmonella*.

11. The method of claim 1 wherein the conveyor belt includes mesh, diamond cut or solid belts.

12. The method of claim 1 wherein additives added to the mist includes chlorine, chlorine compounds, hydrogen compounds or mineral salts to reduce the time or voltage required for causing cell lysis.

13. The method of claim 1 wherein one of the terminals is an anode and the other terminal is a cathode.

14. The method of claim 13 wherein the cathode is grounded.

* * * * *